United States Patent
Case et al.

(10) Patent No.: US 8,244,455 B2
(45) Date of Patent: Aug. 14, 2012

(54) APPARATUS AND METHOD FOR DETERMINING THE POSITION OF A VEHICLE WITH RESPECT TO A TERRAIN

(75) Inventors: Timothy John Case, Marriottsville, MD (US); John B. Mckitterick, Columbia, MD (US); Randy Black, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 956 days.

(21) Appl. No.: 12/207,097

(22) Filed: Sep. 9, 2008

(65) Prior Publication Data

US 2010/0063730 A1    Mar. 11, 2010

(51) Int. Cl.
    *G01C 21/30* (2006.01)
(52) U.S. Cl. ......... 701/210; 701/123; 701/701; 701/207
(58) Field of Classification Search .......... 701/207, 701/123, 210
    See application file for complete search history.

(56) References Cited

U.S. PATENT DOCUMENTS

| | | | |
|---|---|---|---|
| 3,472,471 A | 10/1969 | Badewitz | |
| 4,179,693 A | 12/1979 | Evans et al. | |
| 4,910,674 A | 3/1990 | Lerche | |
| 4,914,734 A | 4/1990 | Love et al. | |
| 4,940,986 A | 7/1990 | Huguenin | |
| 5,006,988 A * | 4/1991 | Borenstein et al. | 701/25 |
| 5,136,297 A | 8/1992 | Lux et al. | |
| 5,218,360 A | 6/1993 | Goetz et al. | |
| 5,564,650 A | 10/1996 | Tucker et al. | |
| 6,347,264 B2 | 2/2002 | Nicosia et al. | |
| 6,430,480 B1 | 8/2002 | Ammar et al. | |
| 6,866,232 B1 | 3/2005 | Finney | |
| 7,019,682 B1 | 3/2006 | Louberg et al. | |
| 7,839,322 B2 * | 11/2010 | Filias et al. | 342/33 |
| 7,865,277 B1 * | 1/2011 | Larson et al. | 701/23 |
| 2006/0089766 A1 * | 4/2006 | Allard et al. | 701/23 |
| 2006/0125680 A1 * | 6/2006 | Thackray | 342/54 |
| 2006/0178828 A1 * | 8/2006 | Moravec | 701/211 |
| 2008/0023587 A1 | 1/2008 | Head et al. | |

OTHER PUBLICATIONS

Colucci, Frank; "Army Aviation," National Defense, Aug. 2007, v92i645pg50; Proquest #1318435911, 6pgs.*
Solanki, Sanjay: Development of Sensor Component For Terrain Evaluation and Obstacle Detection for an Unmanned Autonomous Vehicle, May 2007; Proquest #1372026591, 129 pgs.*

* cited by examiner

Primary Examiner — Robert M. Pond
(74) Attorney, Agent, or Firm — Ingrassia Fisher & Lorenz, P.C.

(57) ABSTRACT

Methods and apparatus are provided for determining a position of a vehicle with respect to a terrain. The method comprises accumulating data received from at least one sensor device regarding the occupancy of a spatial region between the vehicle and a first geographic region of the terrain, generating an evidence grid that describes the occupancy of the spatial region, identifying the position of the first geographic region of the terrain based on the evidence grid and previously compiled reference data, and determining the position of the vehicle based on the position of the first geographic region of the terrain with respect to the previously compiled reference data.

19 Claims, 6 Drawing Sheets

APPARATUS AND METHOD FOR DETERMINING THE POSITION OF A VEHICLE WITH RESPECT TO A TERRAIN

STATEMENT REGARDING FEDERALLY SPONSORED RESEARCH OR DEVELOPMENT

This invention was made with Government support under Government Contract # W31P4Q-07-C-0182 awarded by DARPA. The Government has certain rights in this invention.

TECHNICAL FIELD

The present invention generally relates to vehicle navigation and positioning, and more particularly relates to an apparatus and method for determining the position of a vehicle with respect to a terrain.

BACKGROUND

Sensor devices such as radar systems may be used to determine the position of a vehicle as it travels over a terrain. These sensor devices enable the vehicle to obtain approximations of the elevations associated with a geographic region of the terrain. Based on these approximations, the vehicle may detect and avoid large obstacles in its path or correlate with another source of data, such as a global positioning system (GPS), to identify its position.

While the use of sensor devices to help determine the position of a vehicle is effective, certain drawbacks exist. For example, GPS data may not be available for certain types of terrain, such as extra-terrestrial terrains. This prevents the vehicle from determining its position by correlating the data generated by the radar system with positioning data from a GPS. In addition, such systems do not provide a method that enables the vehicle to accumulate the data that is generated by the sensor device in order to generate a precise data representation of a geographic region of the terrain. Precise data representations of a geographic region of the terrain may be useful when the vehicle is landing in an unfamiliar location such as when a space module is landing on an extra-terrestrial surface.

Accordingly, it is desirable to provide a method and apparatus for determining the position of a vehicle in a GPS denied environment. In addition, it is desirable to provide a method and apparatus for accumulating data generated by a sensor device for the purpose of generating a precise data representation of a region of a terrain. Furthermore, other desirable features and characteristics of the present invention will become apparent from the subsequent detailed description of the invention and the appended claims, taken in conjunction with the accompanying drawings and this background of the invention.

BRIEF SUMMARY

A navigational apparatus is provided for determining the position of a vehicle as it approaches a landing site. The navigational apparatus comprises at least one sensor device coupled to the navigational apparatus for providing data regarding the occupancy of a spatial region between the vehicle and the landing site and a processor coupled to the at least one sensor device and to the navigational apparatus. The processor is configured to accumulate data from the at least one sensor device regarding the occupancy of the spatial region; generate an evidence grid describing the spatial region based on the accumulated data; identify the position of the landing site based on the evidence grid and previously compiled reference data; and determine the position of the vehicle as it approaches a landing site based on the orientation of the sensor device with respect to the vehicle and the position of the landing site with respect to the previously compiled reference data.

In another embodiment, a method is provided for determining a position of a vehicle with respect to a terrain. The method comprises accumulating data received from at least one sensor device regarding the occupancy of a spatial region between the vehicle and a first geographic region of the terrain, generating an evidence grid that describes the occupancy of the spatial region, identifying the position of the first geographic region of the terrain based on the evidence grid and previously compiled reference data, and determining the position of the vehicle based on the position of the first geographic region of the terrain with respect to the previously compiled reference data.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
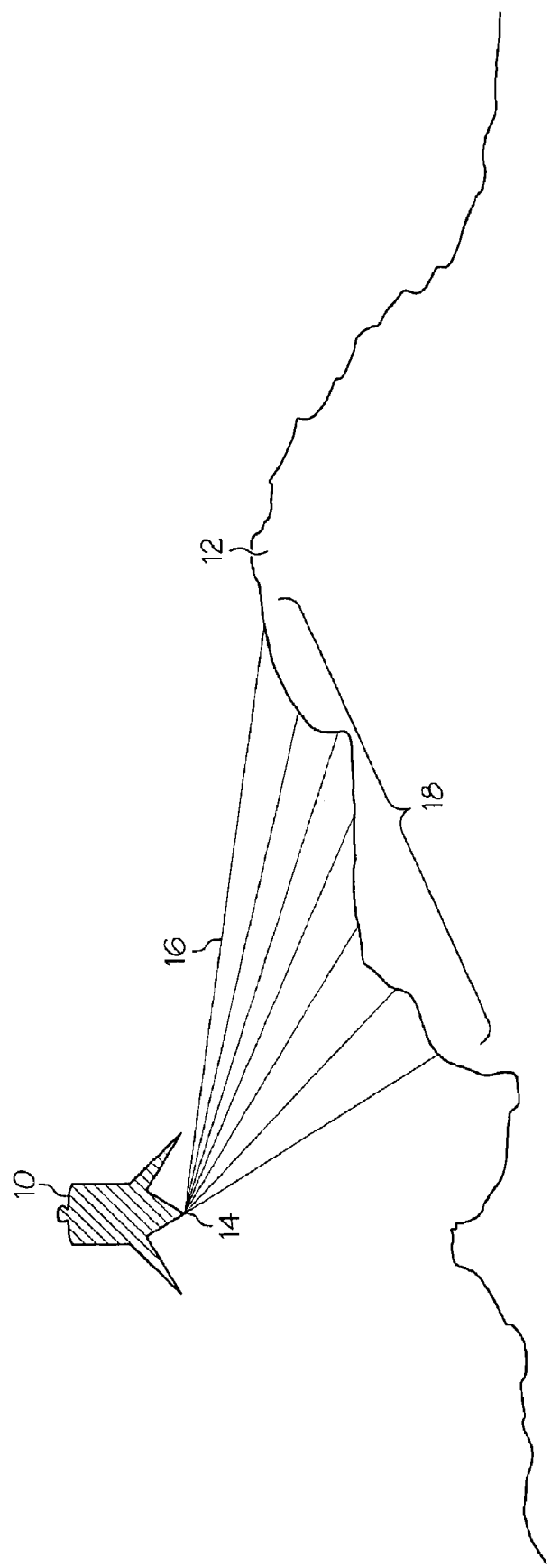
FIG. 1 depicts an exemplary vehicle that uses a sensor device to determine its position.

FIG. 1 depicts an exemplary vehicle 10 that is configured to determine its position according to embodiments of the present invention. The vehicle 10 travels over a terrain 12 at a relatively low altitude. In addition, the vehicle 10 includes one or more sensor devices 14 that are operable to transmit multiple, simultaneous, and/or sequential sensory (detection) signals 16 for the purpose of generating data regarding the contour of a geographic region 18 on the terrain 12. As used herein, the term "vehicle" includes manned and unmanned aircraft, spacecraft, submersible vehicles, or any other vehicle that can travel above a terrain 12. In the depicted embodiment, the vehicle 10 is a spacecraft and the terrain 12 is an extra-terrestrial terrain.

The terrain 12 includes varying elevations and topography and may include flat areas as well as hills, mountains, valleys and other topographical features. The terrain 12 may also include forests, soil, rivers, lakes, metal, concrete, or other features that are commonly found on the surface a terrain. In some embodiments, the surface of the terrain 12 is covered with loose soil, dust, sand, and or other debris that can be displaced by wind, currents, and/or disturbances caused by the vehicle 10 itself. For example, if the vehicle 10 is a space module that is landing on an extra-terrestrial terrain 12, soil and other debris on the terrain 12 may be displaced. This displaced soil may float in the atmosphere above the terrain 12 obscuring the view of the terrain 12 from the vehicle 10.

The sensor device 14 may be a radar, lidar, sonar (in the case of a submersible vehicle), or any other system that is able to generate data regarding the contour and topography of a geographic region 18 of the terrain 12. In one embodiment, the sensor device 14 is a millimeter-wave radar system that is capable of penetrating dust, sand, and other particulate matter in order to generate data regarding the contour of the geographic region 18. The sensor device 14 generates data regarding the occupancy of the spatial region between vehicle 10 and the geographic region 18. This data provides information regarding the distance between the geographic region 18 and the vehicle 10, the contour of the geographic region 18, and any obstacles between the geographic region 18 and the vehicle 10. In some embodiments, the sensor device 14 may be pivoted over a predetermined range, enabling it to generate data regarding regions of terrain that have various orientations with respect to the vehicle 10. The position of the vehicle 10 with respect to the geographic region 18 may be determined based upon the distance between the vehicle 10 and the geographic region 18 (as determined by the data that is generated by the sensor device 14) and the pivot angles of the sensor device 14.

The geographic region 18 may be a potential landing site for the vehicle 10. In this case, the sensor device 14 is able to direct a relatively large number of detection signals toward the landing site 18 as the vehicle 10 approaches. This enables the sensor device 14 to generate a large amount of data regarding the contour and topographical features of the landing site 18. Conversely, the geographic region 18 may simply be a region of the terrain 12 that is in front of the vehicle 10 as it travels to its destination. In this case, the sensor device 14 is able to direct relatively fewer detection signals at the geographic region 18 (e.g., because it is constantly changing). Thus, the sensor device 14 is not able to generate as much data regarding the contour and topographical features of the geographic region 18.

As described below, the data that is generated by the sensor device 14 regarding the spatial region between the vehicle 10 and the geographic region 18 is accumulated by a processing unit on the vehicle 10. By accumulating the data from multiple detection signals that describe at least portions of the spatial region between the sensor device 14 and the geographic region 18, the processing unit is able to generate an accurate data representation of the contour and topography of the geographic region 18.

Figure 2:
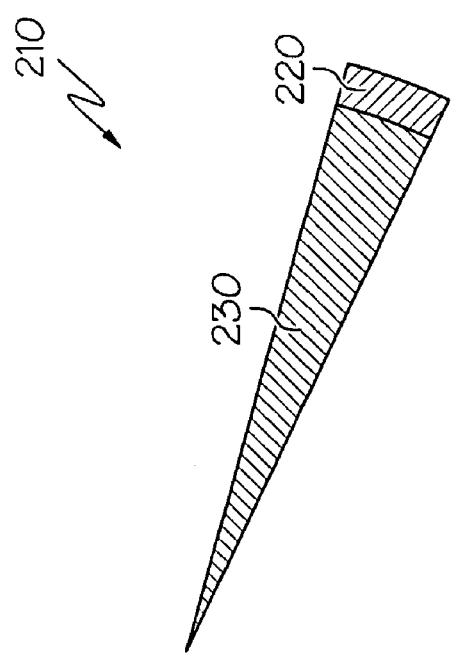
FIG. 2 is a plan view of a first volume detected as a result of a single detection signal transmitted by a sensor device.

FIG. 2 illustrates a first volume 210 detected as a result of a single detection signal transmitted by the sensor device 14 (FIG. 1). The first volume 210 includes an occupied region 220 indicating that a reflecting object was detected therein. The first volume 210 also includes an unoccupied region 230 within which no reflecting object is detected. The reflecting object may be much larger than or smaller than the area represented by the occupied region 220. Analysis of a single signal provides no information regarding the size or shape of the reflecting object that was detected in the occupied region 220.

Figure 3:
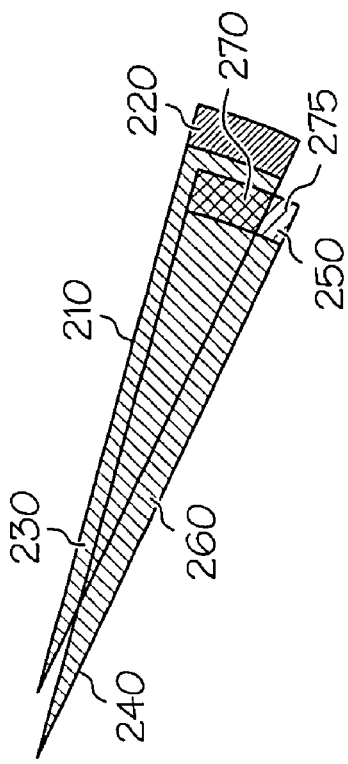
FIG. 3 is a plan view of the first volume and a second volume detected as a result of a second detection signal transmitted by a sensor device.

FIG. 3 illustrates the first volume 210 and a second volume 240 detected as a result of a second detection signal transmitted by the sensor device 14 (FIG. 1). The second volume 240 includes an occupied region 250, closer to the sensing device than the occupied region 220 of the first volume 210, indicating the detected presence therein of a reflecting object. The second volume 240 further includes an unoccupied region 260 within which no reflecting object is detected. The combination of the first volume 210 and the second volume 240 reveals a region 270 wherein no object seems to be present, despite the indication of the occupied 250. This enables one to determine that region 270 is not occupied, and that the reflective object in occupied region 250 must be located in region 275 that does not overlap with the unoccupied region 230 of the first volume 210. Thus, analyzing multiple detection signals that correspond to the same region provides additional information regarding the shape and size of the reflective objects located therein.

Figure 4:
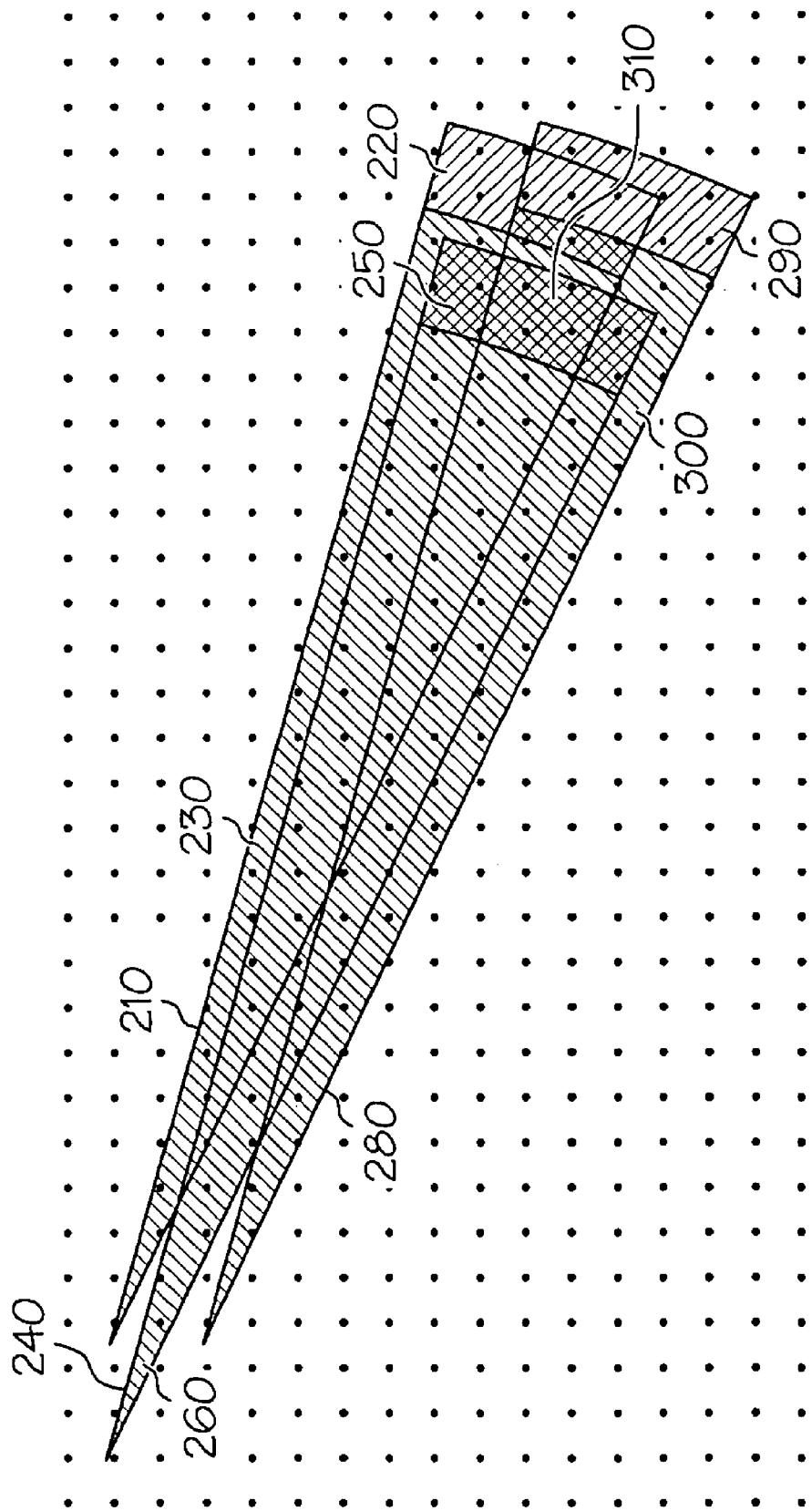
FIG. 4 is a plan view of the first volume, the second volume, and a third volume detected as a result of a third detection signal transmitted by the sensor device.

FIG. 4 illustrates in the first volume 210, the second volume 240, and a third volume 280 detected as a result of a third detection signal transmitted by the sensor device 14 (FIG. 1). The third volume 280 includes an occupied region 290, farther from the sensing device than the occupied regions 220 and 250, indicating the detected presence therein of a reflecting object. The third volume 280 further includes an unoccupied region 300 within which no reflecting object is detected. The combination of the first volume 210, second volume 240, and the third volume 280 reveals that portions of the occupied region 250 offer conflicting information as to whether occupied region 250 is occupied by a reflecting object. For example, region 310 appears to indicate the presence of a reflecting object respect to the second volume 240. However, region 310 does not indicate the presence of a reflecting object with respect to the first volume 210 or the third volume 280. These conflicting regions may result from sensor or navigation errors, or moving targets, and lead to indeterminate points that are neither occupied nor unoccupied. The occupancy of such regions can only be described with regard to a probability that they include a reflecting object, as described below.

Embodiments of the present invention generate a three dimensional evidence grid that describes the spatial region between the vehicle 10 (FIG. 1) and the geographic region 18 (FIG. 1). An evidence grid, also called an occupancy matrix, is a collection of cells and a measure of occupancy for each cell. Each cell represents a sub-region in the spatial region between the vehicle 10 (FIG. 1) and the geographic region 18 (FIG. 1) and is associated with a value representing the probability that the sub-region is occupied by a reflecting object.

The computational method described below may be utilized to assign probability values to the cells of an evidence grid in order to match as well as possible the measurements corresponding to the geographic region 18 (FIG. 1). This computational method turns the problem of determining the assigning these probability values into an optimization problem that determines the occupancies for each cell of the evidence grid that maximize the probability that the modeled measurements of the evidence gird match the actual measurements of the geographic region 18 (FIG. 1).

Figure 5:
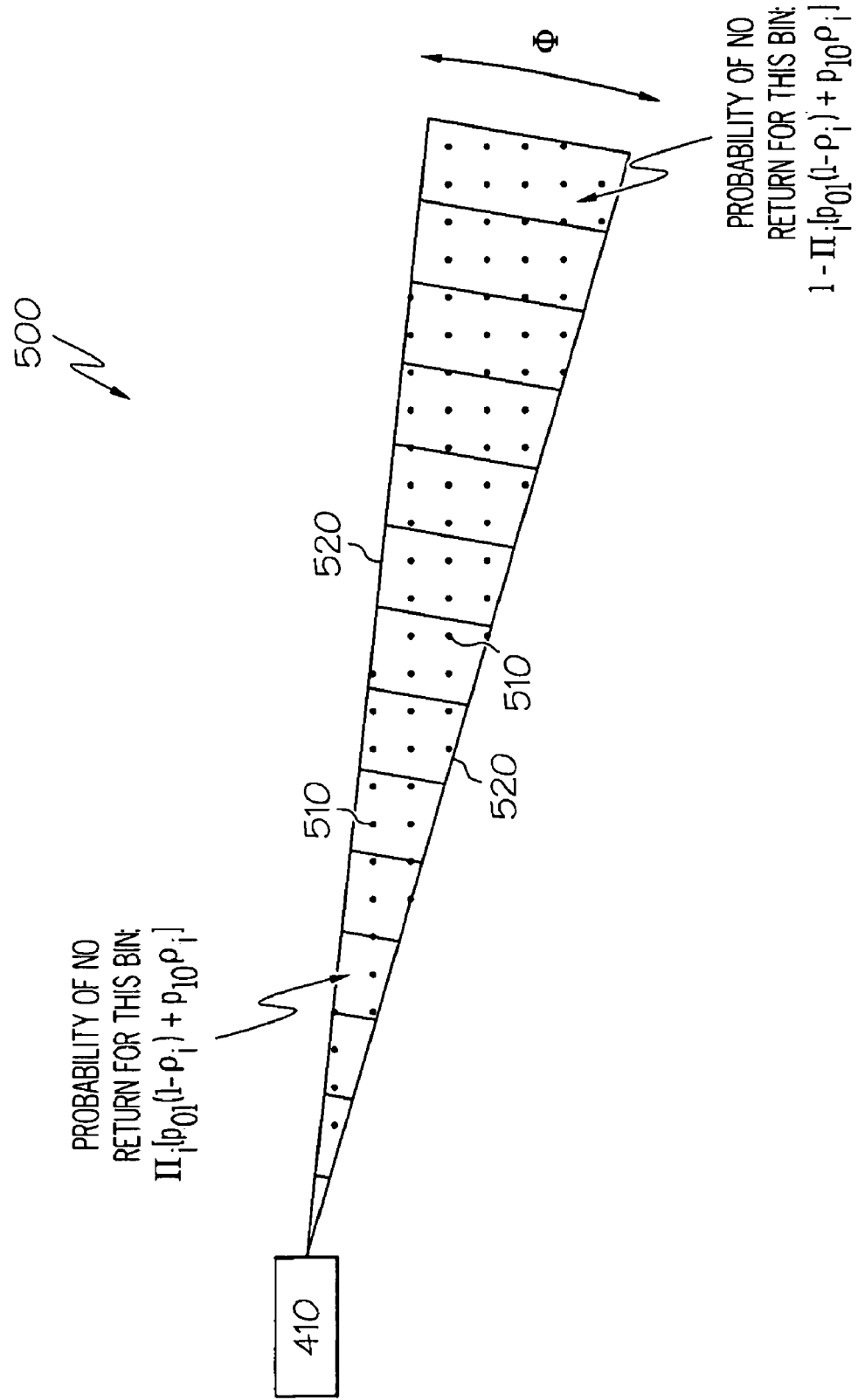
FIG. 5 is a plan view of a measurement made by a sensor device of a spatial region between the vehicle of FIG. 1 and a geographic region.

FIG. 5 is a plan view of a measurement made by a sensor device 410 of a spatial region 500 between the vehicle 10 (FIG. 1) and the geographic region 18 (FIG. 1) that can be modeled by an evidence grid. The evidence grid comprises a plurality of cells that each represent sub-regions of the region 500. The center points 510 of these cells are shown superimposed on the region 500. Additionally, the region 500 is divided into multiple bins 520, each of which includes one or more cells and is a respective distance from the sensor device 410. As depicted, the region 500 is conical in configuration and has an angular width (D) within which a detection signal transmitted by the sensor device 410 will, with some probability, reflect off of a volume in space represented in the evidence grid by an occupied cell.

As used herein, $p_{11}$ refers to the probability that a volume in space represented by an occupied cell reflects the detection signal. This probability (e.g., $p_{11}$) may be independent of both the distance between the volume in space and the sensor device 410 (up to the maximum range of the sensor device), and of the distance between the volume in space and the central axis of the sensor device (up to the angular width of the detection signal). In addition, $p_{00}$ refers to the probability that a volume in space represented by an unoccupied cell does not reflect the detection signal. Using both of these probabilities it is possible to determine the probability that a volume in space represented by an unoccupied cell reflects the detection signal (a false positive response from the sensor) as $p_{01}=1-p_{00}$, and the probability that a volume in space represented by an occupied cell does not reflect the detection signal (a false negative response) as $p_{10}=1-p_{11}$.

In one instance, an actual radar measurement results in a first detection of a reflecting object at some bin 520 that is a distance r from the sensor device 410. This radar measurement provides information not just about the volume of space that is a distance r from the sensor device 410, but also regarding the volume of space represented by the bins 520 that are at a distance less than r from the sensor device 410. In this case, the probability that a theoretical radar measurement of an evidence grid is the same as a measurement of the actual sensed environment is calculated in the following manner. First, the probability that a single cell makes a reflection is determined. For example, if $\rho_i$ refers to the probability that the ith cell in the evidence grid is occupied, then the probability that a corresponding sub-region in space produces a reflection may be determined by:

$$p_i = p_{11}\rho_i + p_{00}(1-\rho_i) \quad (1)$$

and the probability that the corresponding sub-region in space does not produce a reflection may be determined by:

$$\tilde{p}_i = 1 - p_i = p_{10}\rho_i + p_{01}(1-\rho_i) \quad (2)$$

For each range bin 520 up to but not including the range bin within which an object is detected, the probability that there is no return is the probability that each of the cells in that range bin do not reflect the detection signal, which may be expressed as $\pi_i \tilde{p}_i$. For the range bin 520 in which there was an object detection, the probability that there is a reflection given the state of the evidence grid is determined by calculating the probability that there was no detection and subtracting from 1, or $1 - \pi_i \tilde{p}_i$. Thus, in order to detect a reflection, at least one of the cells must have reflected the detection signal. The net result for the probability that a theoretical radar measurement of the evidence grid matches the actual radar measurement of the sensed environment may be expressed as:

$$P_k = \pi_{ik} \tilde{p}_{ik} [1 - \pi_{jk} \tilde{p}_{jk}] \quad (3)$$

where the subscript ik runs in the kth detection signal over all of the cells lying in the range bin(s) 520 closer to the sensor device 410 than the range bin in which there was an object detection, and the subscript jk runs in the kth detection signal over all of the cells lying in the range bin in which there was an object detection. Further, the probability that all of the theoretical radar measurements made on the evidence grid match the actual measurements made by multiple detection signals transmitted by the sensor device 410 can be calculated as:

$$\beta = \pi_k P_k \quad (4)$$

The goal is to find the occupancies $\rho_i$ which maximize $\beta$. In so doing, the occupancies for the cells of the evidence grid that are most likely to match the measurements of the actual sensed environment (e.g., the geographic region 18 (FIG. 1)) may be determined.

The product in Eq. (4) can be rearranged so that it is more transparent. In particular, the dependence of $\beta$ on the occupancy of a single cell may be expressed as:

$$\beta = \{\pi_{ik}\tilde{p}_i \pi_k \cdot [1 - \pi_{jk}\tilde{p}_{jk}]\} \cdot [\text{terms independent of } \rho_i] = P(\rho_i) \cdot [\text{terms independent of } \rho_i]$$

where the product k is over the detection signals for which the ith cell is in the detection signal but from which there is no return, and the product over k' is over the detection signals for which the ith cell is in the range bin for which there was a detection. This expression splits the dependence on $\rho_i$ into two parts. The first part is a measure of how often the cell is not seen by a detection signal. The second part is a measure of how well the current evidence grid supports the actual measured returns.

With regard to Eq. (5), if a cell never appears in a detected range bin, then the second product in Eq. (5) (over k') is empty and the occupancy of the cell can be set to zero. In other words, if the cell is never seen by a detection signal, then its occupancy can be set to zero. Further, if the first product in Eq. (5) (over k) is empty, then the cell has always been seen by a detection signal. In this case, $\rho_i$ can be set to 1.

To solve for the optimum occupancies for those cells which cannot be trivially set to 0 or 1, the quantity inside the braces in Eq. (5) (e.g., $P(\rho_i)$) must be examined. In one embodiment, the maximum of 13 with respect to the $\rho_i$ is determined, subject to the constraint that $0 \leq \rho_i \leq 1$ (since $\rho_i$ is a probability of occupancy).

The maximum of 13 may be determined by finding values for $\rho_i$ that satisfy the following conditions for each cell:

$$\partial P(\rho_i)/\partial \rho_i = 0, \; 0 \leq \rho_i \leq 1$$

$$\partial P(\rho_i)/\partial \rho_i > 0, \; \rho_i = 1$$

$$\partial P(\rho_i)/\partial \rho_i < 0, \; \rho_i = 0 \quad (6)$$

Solving these equations for the optimum point may be done in a conventional manner, such as using, for example, a steepest-descent method.

Figure 6:
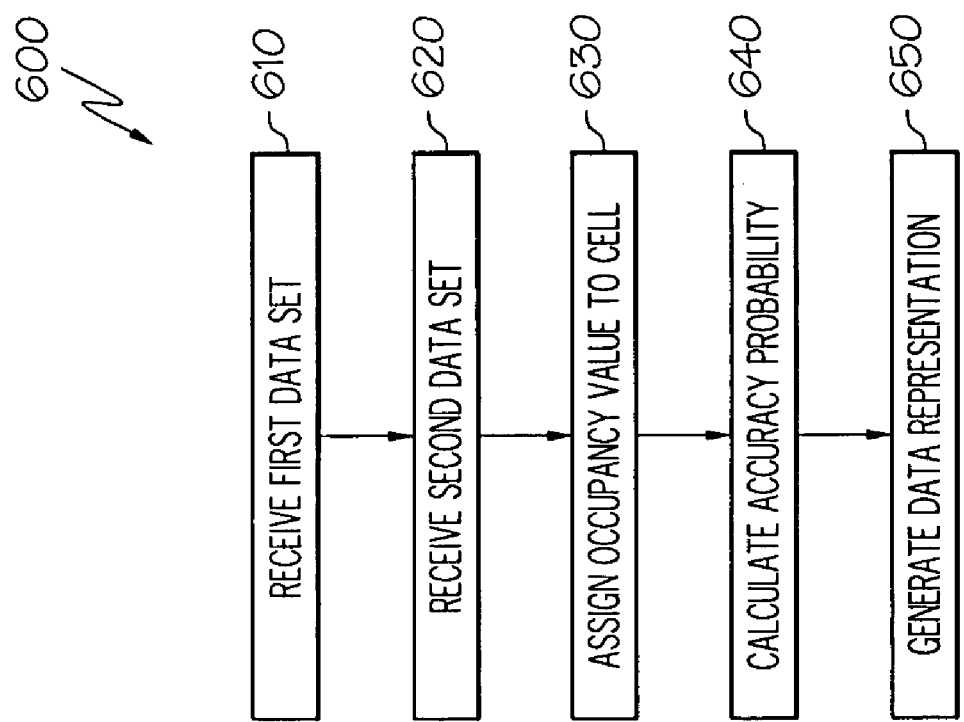
FIG. 6 is a flowchart of a method for generating an evidence grid according to one embodiment of the present invention.

FIG. 6 illustrates a method 600 for generating an evidence grid according to one embodiment of the present invention. The method 600 is illustrated as a set of operations shown as discrete blocks. The order in which the operations are described is not to be necessarily construed as a limitation.

At a block 610, a first data set is received corresponding to a first detection signal transmitted over a first spatial region (e.g., a spatial region between the sensor device 14 (FIG. 1) and the geographic region 18). At a block 620, a second data set is received corresponding to a second detection signal transmitted over a second spatial region. The second region may have a first sub-region in common with the first region.

At a block 630, based on the first data set, first occupancy values are assigned to the cells in an evidence grid that represents the first region. For example, the evidence grid corresponding to the geographic region 18 (FIG. 1) may be assigned occupancy values (i.e., occupied/unoccupied) based on the presence of absence of a reflecting objects detected in the first spatial region.

At a block 640, based on the first data set and the second data set, the probability that each of the first occupancy values accurately characterizes the presence of a reflecting object in the corresponding sub-regions of the spatial region is calculated using the optimum cell occupancy calculations described above. It should be noted that additional data sets that correspond to detections signals covering spatial regions that overlap with, or are the same as, the first spatial region may also be received and utilized to calculate these probabilities. Each such data set provides additional information and results in increased accuracy with respect to these probabilities.

At a block 650, a data representation of the first spatial region is generated based on the probability calculation. For example, if it is determined that a cell of the evidence grid is associated with probability that exceeds a predetermined threshold (e.g., 60%), then the data representation will indicate that the sub-region represented by that cell is occupied by an obstruction. Otherwise, the data representation will show that the sub-region is not occupied. Upon completion, the data representation will describe the contour and topography of the geographic region 18 (FIG. 1).

Figure 7:
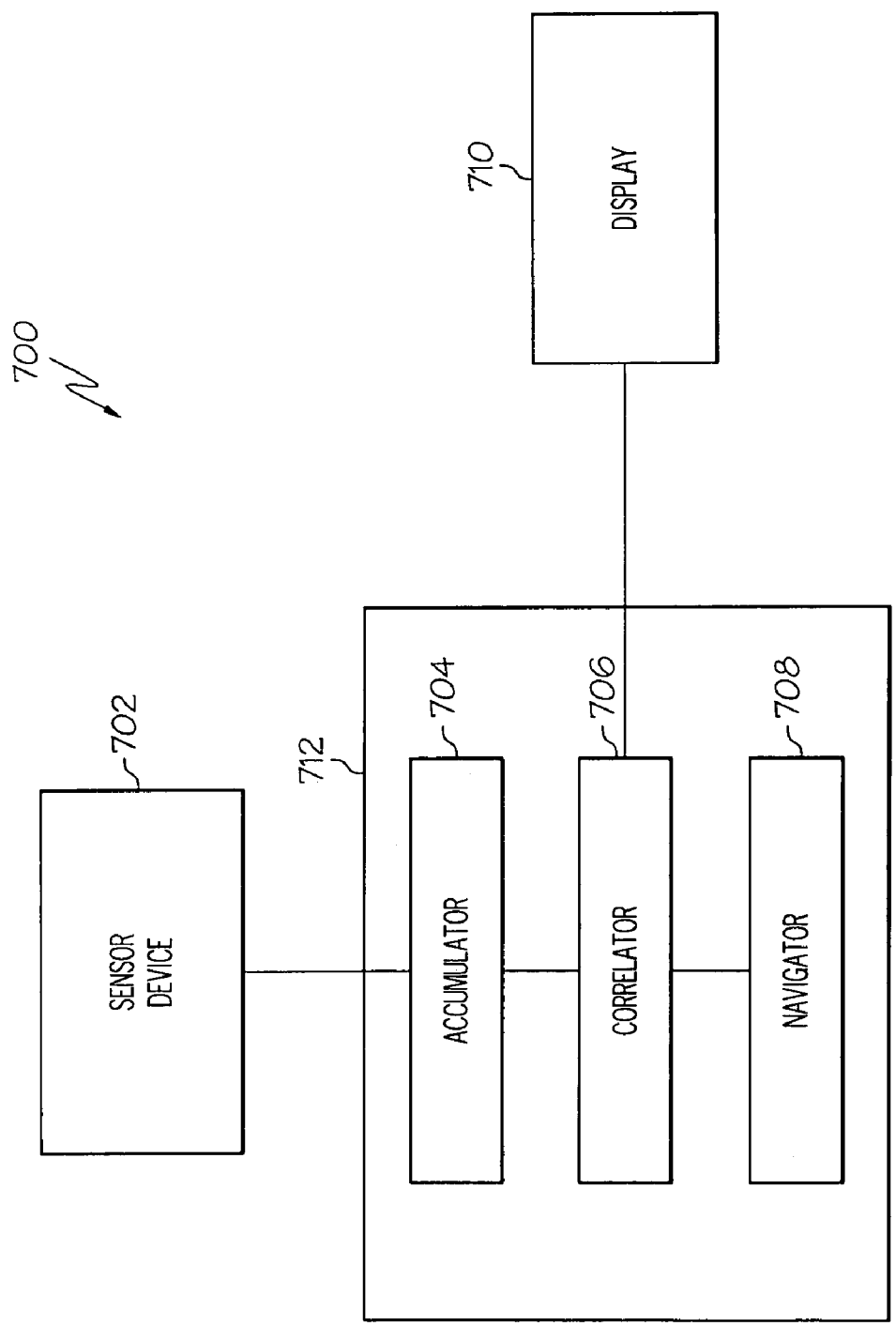
FIG. 7 is a block diagram of an exemplary apparatus for determining the position of the vehicle of FIG. 1.

Turning now to FIG. 7, a block diagram of an exemplary apparatus 700 for determining the position of the vehicle 10 with respect to the terrain 12 of FIG. 1 is depicted. The apparatus 700 includes a sensor device 702, an accumulator 704, a correlator 706, a navigator 708 and a display 710. The sensor device 702 is coupled to the accumulator 704 and the accumulator 704 is coupled to the correlator 706. The correlator 706 is coupled to both the navigator 708 and the display 710. In the depicted embodiment, the functions of the accumulator 704, the correlator 706, and the navigator 708, as they are described below, are implemented as software modules that are performed by one or more processors 712 or controllers. However, it should be understood that other embodiments of the present invention may utilize other configurations for these components and that the functions of the accumulator 704, the correlator 706, and the navigator 708 may be implemented in hardware, software, a combination of both and/or as separate units which share or have their own processors.

As described above, the sensor device 702 directs multiple, simultaneous and/or sequential detection signals toward a geographic region (e.g., the geographic region 18 FIG. 1) of a terrain (e.g., the terrain 12 of FIG. 1) and generates data regarding the spatial region between a vehicle (e.g., the vehicle 10 of FIG. 1) and the geographic region.

The accumulator 704 receives the data from the sensor device 702. The accumulator 704 then generates an evidence grid for the spatial region between the vehicle and the geographic region and a data representation of the geographic region using the method described above with respect to FIG. 6.

The correlator 706 receives the data representation of the geographic region from the accumulator 704 and compares it to previously compiled reference data for the terrain. The previously compiled reference data may be any previously compiled data that describes the actual elevations and topographical features of the terrain. For example, the reference data may comprise a high resolution map of an extra-terrestrial terrain that is generated based on data accumulated via satellites images and other data sources. The correlator 706 compares the data representation of the geographic region (e.g., as by the accumulator 704) with the reference data to identify a corresponding actual region of terrain based on the relative contours and topographical features of both. The correlator 706 then determines a position (e.g., a determined position) of the vehicle with respect to the terrain based on the position of the vehicle with respect to the geographic region (e.g., determined based on the pivot angle of and the data generated by the sensor device 702) and the position of the corresponding region with respect to the previously compiled reference data describing the terrain.

In addition, the correlator 706 generates a model of the geographic region based on the data representation and the corresponding reference data. To generate this model, the correlator 706 determines whether there are any differences between the data representation and the corresponding reference data. Next, the correlator 706 generates the model using the portions of the data representation of the geographic region and the corresponding reference data that are most likely to provide an accurate description of the geographic region.

For example, when the vehicle is approaching a landing site the correlator 706 may determine that the data representation of the geographic region is more likely to be accurate. In this case, the sensor device 702 is able to generate a large amount of data regarding the landing site as the vehicle approaches. As a result, the accumulator 704 receives a large number of data sets describing the spatial region between the vehicle and the geographic region and is able to generate a very accurate evidence grid. The data representation that is generated by the accumulator 704 under such circumstances may contain a large number of differences with respect to the corresponding reference data and may provide a better description of the contour of the geographic region. Therefore, when generating the model the correlator 706 will use the data representation to describe the geographic region whenever there is a discrepancy between the data representation of the geographic region and the corresponding descriptive data.

Conversely, when the vehicle is traveling en route to a destination the correlator 706 may determine that the reference data is more likely to represent the geographic region. As described above, in this case the geographic region is constantly changing and the sensor device 702 is able to transmit fewer detection signals. As a result, the accumulator 704 receives fewer data sets regarding the occupancy of the spatial region between the vehicle and the geographic region and the resulting evidence grid will not be as precise. The data representation that is generated by the accumulator 704 under such circumstances may not be as accurate a description of the geographic region as the corresponding reference data. Therefore, when generating the model the correlator 706 will use the reference data to describe the geographic region and may only use the data representation when there is a large discrepancy between the data representation and the corresponding reference data. A large discrepancy between the data representation and the corresponding reference data may indicate that an obstacle has occupied a portion of the geographic region after the time when the reference data was generated.

The navigator 708 receives the determined position of the vehicle and the model of the geographic region from the correlator 706. The navigator 708 may then adjust the actual position of the vehicle based on the determined position or any obstacles that are described by the model. For example, if the vehicle is traveling along the terrain en route to a destination the navigator 708 may adjust the actual position of the vehicle based on the determined position to ensure that the vehicle stays on a predetermined track or to avoid any obstacles in its path. In the case where the vehicle 10 is approaching a landing site, the navigator 708 may adjust the actual position of the vehicle to ensure that it lands in a predetermined location or to avoid detected obstacles that could interfere with the landing.

The display 710 presents an image of the model of the geographic region to a user (e.g., a pilot or co-pilot) of the vehicle. In the case where the vehicle is moving along the terrain en route to a destination, the image will constantly change as the geographic region changes. The pilot or co-pilot may manually maneuver the vehicle to avoid the terrain or any detected obstacles if needed. In the case where the vehicle is approaching a landing site, the image will comprise a visual depiction of the landing site enabling the pilot or co-pilot to determine the safest place for the vehicle to land.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for determining a position of a vehicle with respect to a terrain, the method comprising:
   accumulating data received from a sensor device regarding an occupancy of a spatial region between the vehicle and a first geographic region of the terrain;
   generating an evidence grid from the sensor data that describes the occupancy of the spatial region, wherein the evidence grid comprises a first set of cells that indicate an occupancy by an object and a second set of cells that does not;
   aggregating the occupancy from the first set of cells and the second set of cells thereby establishing a joint probability that a reflection from the first set of cells and the second set of cells matches the sensor data;
   identifying the position of the first geographic region of the terrain based on the evidence grid and previously compiled reference data; and
   determining the position of the vehicle based on the position of the first geographic region of the terrain with respect to the previously compiled reference data.

2. The method of claim 1, wherein the sensor device is a millimeter-wave radar.

3. The method of claim 2, wherein the step of generating the evidence grid further comprises generating a three-dimensional evidence grid that describes the occupancy of the spatial region, wherein each cell of the three-dimensional evidence grid represents a sub-region of the spatial region and is associated with a value representing the probability that the sub-region is occupied.

4. The method of claim 3, wherein the step of generating the evidence grid further comprises:
   generating the three-dimensional evidence grid that describes the occupancy of the spatial region, wherein the accuracies of the probabilities increases as the amount of data received from the sensor device regarding the spatial region increases.

5. The method of claim 4, wherein the step of identifying further comprises:
   generating a data representation of the first geographic region based on the three-dimensional evidence grid; and
   identifying the position of a corresponding region from the previously compiled reference data based on similarities between the contour and topography of the first geographic region and the corresponding region.

6. The method of claim 5, wherein the step of determining further comprises:
   determining the position of the vehicle with respect to the first geographic region based on the orientation of the sensor device with respect to the vehicle and the accumulated data; and
   determining the position of the corresponding region based on the previously compiled reference data.

7. The method of claim 6, further comprising:
   generating a model of the first geographic region based on the data representation of the first geographic region and the corresponding region described by the previously compiled reference data.

8. The method of claim 7, further comprising:
   altering the position of the vehicle based on the determined position to maintain a desired track.

9. The method of claim 7, further comprising:
   altering the path of the vehicle to avoid any obstacles that are described by the model.

10. The method of claim 1, wherein the method utilizes at least two sensor devices.

11. A navigational apparatus for determining the position of a vehicle as it approaches a landing site, the navigational apparatus comprising:
    a sensor device configured to provide data regarding an occupancy of a spatial region between the vehicle and the landing site;
    a processor coupled to the at least one sensor device and to the navigational apparatus, the processor configured to:
       accumulate the data from the sensor device regarding the occupancy of the spatial region;
       generate an evidence grid describing the occupancy of the spatial region based on the accumulated data, wherein the evidence grid comprises a first set of cells that indicate the occupancy by an object and a second set of cells that does not;
       aggregate the occupancy from the first set of cells and the second set of cells thereby establishing a joint probability that a reflection from the first set of cells and the second set of cells matches the sensor data;
       identify a position of the landing site based on the evidence grid and previously compiled reference data; and
       determine the position of the vehicle as it approaches the landing site based on the orientation of the sensor device with respect to the vehicle and the position of the landing site with respect to the previously compiled reference data.

12. The navigational apparatus of claim 11, wherein the sensor device comprises at least a millimeter-wave radar capable of penetrating particulate matter.

13. The navigational apparatus of claim 12, wherein the evidence grid comprises a three-dimensional evidence grid, wherein each cell is representative of a sub-region of the spatial region between the vehicle and the landing site and is associated with a value representing the probability that the sub-region is occupied.

14. The navigational apparatus of claim 13, wherein the accuracy of the probabilities associated with each cell of the evidence grid increases as the amount of data received from the at least one sensor device regarding the spatial region increases.

15. The navigational apparatus of claim 14, wherein the processor is further configured to:

generate a data representation of the landing site based on the three-dimensional evidence grid; and identify the position of a corresponding region from the previously compiled reference data based on similarities between the contour and topography of the landing site and the corresponding region.

16. The navigational apparatus of claim 15, wherein the processor is further configured to:

generate a model of the landing site based on the data representation of the landing site and the corresponding region described by the previously compiled reference data, alter the path of the vehicle to avoid any obstacles described by the model.

17. The navigational apparatus of claim 16, further comprising a display device coupled to the processor and configured to display a visual representation of the model.

18. A method for determining the position of a space module above an extra-terrestrial terrain, the method comprising:

accumulating data received from a millimeter wave-radar system regarding the occupancy of a spatial region between the space module and a first geographic region of the extra-terrestrial terrain;

generating a three-dimensional evidence grid that describes the occupancy of the spatial region from the data comprising a plurality of cells, wherein each cell of the three-dimensional evidence grid represents a sub-region of the spatial region and is associated with a value representing the probability that the sub-region is occupied;

generating a data representation of the first geographic region based on the three-dimensional evidence grid;

aggregating the occupancy of the spatial region from the plurality of cells thereby establishing a joint probability that a reflection from the first set of cells and the second set of cells matches the sensor data;

identifying the position of a corresponding region described by previously compiled reference data based on similarities between the contour and topography of the first geographic region and the corresponding region; and determining the position of the space module based on the orientation of the millimeter-wave radar with respect to the space module and the position of the landing site with respect to the previously compiled reference data.

19. The method of claim 18, further comprising:

generating a model of the landing site based on the data representation of landing site and the corresponding region described by the previously compiled reference data.

* * * * *